US012108854B1

(12) United States Patent
Kapavik

(10) Patent No.: US 12,108,854 B1
(45) Date of Patent: Oct. 8, 2024

(54) FOLDABLE HOLDER WITH RETRACTABLE CLOSURE

(71) Applicant: Daniel Kapavik, Washington, DC (US)

(72) Inventor: Daniel Kapavik, Washington, DC (US)

( * ) Notice: Subject to any disclaimer, the term of this patent is extended or adjusted under 35 U.S.C. 154(b) by 34 days.

(21) Appl. No.: 18/200,941

(22) Filed: May 23, 2023

(51) Int. Cl.

| | |
|---|---|
| ***A45C 7/00*** | (2006.01) |
| ***A45C 11/00*** | (2006.01) |
| ***A45C 13/02*** | (2006.01) |
| ***A45C 13/10*** | (2006.01) |
| *B42F 7/06* | (2006.01) |

(52) U.S. Cl.

CPC ............ *A45C 7/0095* (2013.01); *A45C 11/00* (2013.01); *A45C 13/02* (2013.01); *A45C 13/10* (2013.01); *A45C 2011/002* (2013.01); *A45C 2011/003* (2013.01); *A45C 2013/025* (2013.01); *A45C 2013/1015* (2013.01); *B42F 7/06* (2013.01); *B42P 2241/02* (2013.01)

(58) Field of Classification Search

CPC ....... A45C 7/0095; A45C 11/00; A45C 13/02; A45C 13/10; A45C 2011/002; A45C 2011/003; A45C 2013/025; A45C 2013/1015; B42F 7/06; B42P 2241/02

USPC ......... 206/320, 576; 281/31, 42; 383/38–40; 402/75

See application file for complete search history.

(56) References Cited

U.S. PATENT DOCUMENTS 3,142,495 A 7/1964 Lu
3,339,875 A 9/1967 Gerald
3,808,415 A 4/1974 Hurst
4,738,547 A * 4/1988 Brown ................. A45C 7/0095 383/119
5,215,398 A * 6/1993 White ................. B42F 13/0033 281/31

(Continued)

FOREIGN PATENT DOCUMENTS

| | | |
|---|---|---|
| DE | 3820274 | 12/1989 |
| TW | M459992 | 8/2013 |

OTHER PUBLICATIONS

R Spider Wireless—Pilot Kneeboard, Amazon.com: *R Spider Wireless Pilot Kneeboard with Aluminum Clipboard. Compatible with 7.9 inch Apple iPad Mini 3 and 4, Android Devices Similar in Size : Electronics*, known at least as early as May 15, 2023, last viewed on Aug. 22, 2023, 10 pgs.

*Primary Examiner* — Luan K Bui

(74) *Attorney, Agent, or Firm* — Womble Bond Dickinson (US) LLP

(57) ABSTRACT

The foldable holder includes a first panel, a second panel, a third panel, a shroud, and a retractable closure. The foldable holder is foldable between a closed configuration in which the panels are stacked and an open configuration in which the panels are substantially coplanar with one another. The shroud attaches to the second panel to define a shroud passage between the second panel and the shroud. The retractable closure is moveable between a secured state in which the retractable closure is engaged with the first panel to retain the closure in the closed configuration and a retracted state. The retractable closure comprises an elastic retraction member to urge the retractable closure towards the retracted state and a closure tab engaged with the engagement surface in the secured state. The closure tab is at least partially disposed within the shroud passage in the retracted state.

20 Claims, 12 Drawing Sheets

(56) References Cited

U.S. PATENT DOCUMENTS

| | | | | | |
|---|---|---|---|---|---|
| 5,236,226 | A | * | 8/1993 | Sheffield | B42F 7/02<br>281/31 |
| 5,277,451 | A | * | 1/1994 | Garza | B42D 5/022<br>281/31 |
| 6,237,766 | B1 | | 5/2001 | Hollingsworth | |
| 7,077,596 | B1 | | 7/2006 | Bianco et al. | |
| 9,027,722 | B1 | | 5/2015 | Parker | |
| 10,182,632 | B2 | | 1/2019 | Kearsley | |
| 2003/0102235 | A1 | * | 6/2003 | Swaim | A47B 23/002<br>206/320 |
| 2008/0240844 | A1 | * | 10/2008 | Fastabend | B42F 7/10<br>402/77 |
| 2009/0565050 | | | 10/2009 | Burpee | |
| 2010/0067974 | A1 | | 3/2010 | Bindra | |
| 2014/0333057 | A1 | | 11/2014 | Ng | |
| 2021/0134180 | A1 | | 5/2021 | Fish et al. | |
| 2022/0160029 | A1 | * | 5/2022 | Feldman | A24F 15/18 |

* cited by examiner

FOLDABLE HOLDER WITH RETRACTABLE CLOSURE

FIELD OF THE DISCLOSURE

The present disclosure relates generally to document and digital device holders, and more specifically, to retractable closures for foldable holders for documents or digital devices.

BACKGROUND

Military missions and emergency responses often lead to situations that require review of printed documents or electronic data. Often these missions occur in locations or under conditions that make review of documents or data difficult. As a result, soldiers and first responders continue to rely upon printed media or compact digital devices to provide information while in the field, such as navigational maps and tablet devices. The information necessary to carry out a mission must be accessible under adverse conditions which can include multitasking within moving vehicles or outdoor environments that can include heavy rain or blowing sand.

Several attempts have been made to develop products that protect and hold printed media or digital devices. For example, envelope-type map pouches are flexible and can be rolled or folded into compact configurations for transport. Flexible map pouches alone, however, do not readily permit marking or writing on the pouch Digital devices often can be susceptible to damage from impacts and water. First responders and military personnel are space and weight conscience when deploying, making heavy duty, dedicated digital device holders cumbersome.

SUMMARY

In an aspect of the present disclosure, a foldable holder includes a first panel, a second panel, a shroud, a third panel, and a retractable closure. The first panel has an engagement surface extending along an end edge of the first panel. The shroud is attached to the second panel to define a shroud passage between the shroud and the second panel. The foldable holder has a closed configuration in which the first panel, the second panel, and the third panel are stacked with one another, and an open configuration in which the first panel, the second panel, and the third panel are substantially coplanar with one another. The retractable closure is moveable between a secured state and a retracted state. In the secured state the retractable closure is engaged with the first panel to retain the foldable holder in the closed configuration. The retractable closure includes an elastic retraction member that urges the retractable closure toward the retracted state and a closure tab engaged with the engagement surface in the secured state. The closure tab is at least partially disposed within the shroud passage in the retracted state.

In aspects, the closure tab defines a tab loop that receives the retraction member therethrough such that the closure tab is slidably coupled to the retraction member. The closure tab may be engageable with the engagement surface at multiple positions.

In some aspects, in the retracted state, the closure tab at least partially protrudes from the shroud passage and the retraction member is concealed within the shroud passages. In the secured state, the retractable closure may extend about the end edge of the first panel. The retraction member may secure to the second panel to form a bight, the bight may have an elastic force therein to urge the retractable closure toward the retracted state, and the elastic force of the bight may be adjustable in the retracted state.

In certain aspects, the retractable closure is disposed about a first side edge of the first panel in the secured state. The retractable holder may include a second retractable closure. The second retractable closure may be disposed about a second side edge of the first panel opposite the first side edge of the first panel in the secured sate.

In another aspect of the present disclosure, a foldable holder includes a first panel, a second panel, a third panel, and a retractable closure. The first panel has an exterior face, an interior face, and an end edge. The exterior face of the first panel has an engagement surface disposed along the end edge. The second panel extends from the first panel in a direction away from the end edge of the first panel. The second panel has an exterior face and an interior face. The second panel includes a shroud attached to the exterior face of the second panel. The second panel and the shroud define a shroud passage between the shroud and the exterior face of the second panel. The third panel extends from the second panel in the direction away from the end edge of the first panel. The third panel has an exterior face and an interior face. The foldable holder has a closed configuration in which the first panel, the second panel, and the third panel are stacked with one another and an open configuration in which the first panel, the second panel, and the third panel are substantially coplanar with one another. The retractable closure is attached to the second panel and is moveable between a secured state and a retracted state. In the secured state the retracted closure is engaged with the first panel to retain the foldable holder in the closed configuration. The retractable closure includes an elastic retraction member urging the retractable closure toward the retracted state and a closure tab slidably coupled to the retraction member. The closure tab is at least partially disposed in the shroud passage in the retracted state.

In aspects, the closure tab is engageable with the engagement surface at multiple positions. The second panel may define two closure slots separated by a closure stop section. The two closure slots may be configured to receive a respective end of the retraction member such that the retraction member forms a bight. The bight may have an interior segment that extends along the interior face of the second panel and secures the retraction member to the second panel. The bight may have an exterior segment disposed between the exterior face of the second panel and the shroud. The closure stop section may contact the retractable closure in the retracted state such that the closure tab extends from the shroud passage.

In particular aspects, the closure tab is made of an inelastic material and defines a tab loop that receives the retraction member therethrough to slidably couple the closure tab to the retraction member. The closure tab may include a first part of a two-part fastener system and the engagement surface includes a second part of the two-part fastener system. The two-part fastener system may be a hook and loop fastener system with one of the first part or the second part being a hook part and the other of the first part or the second part being a loop part.

In certain aspects, the first panel, the second panel, and the third panel are monolithically formed with one another. The second panel may include a retention platform having a plurality of straps attached to the interior face of the second panel. The plurality of straps may be configured to retain a digital device to the foldable holder. The plurality of the straps may include a transvers strap that may be configured to extend across the digital device and two corner straps that may be configured to receive corners of the digital device. The retention member may secure to the retention platform.

In another aspect of the present disclosure, a foldable holder includes a piece of fabric of monolithic construction, an engagement surface, a shroud, and a retractable member. The piece of fabric has an exterior face, an interior face opposite the exterior face, a first side edge, a second side edge opposite the first side edge, a first end edge, and a second end edge opposite the first end edge. The piece of fabric is configured to fold relative to itself such that a first fold and a second fold define a first panel, a second panel, and a third panel. The first panel is defined by the first side edge, the first end edge, the second side edge, and the first fold. The second panel is defined by the first side edge, the first fold, the second side edge, and the second fold. The third fold is defined by first side edge, the second fold, the second side edge, and the second end edge. The foldable holder is configured to fold between a closed configuration in which the piece of fabric is folded such that the first panel, the second panel, and the third panel are stacked with one another and an open configuration in which the piece of fabric is unfolded. The engagement surface is attached to the exterior face of the first panel and the extending along the first end edge. The shroud is attached the exterior face of the second panel to define a shroud passage between the exterior face of the second panel and the shroud. The retractable closure is attached to the second panel and moveable between a secured state and a retracted state. In the secured state the retractable closure is engaged with the engagement surface to retain the foldable holder in the closed configuration. The retractable closure includes an elastic retraction member urging the retractable closure to the retracted state and a closure tab slidably coupled to the retraction member. The closure tab is at least partially disposed in the stroud passage in the retracted state.

Further, to the extent consistent, any of the embodiments or aspects described herein may be used in conjunction with any or all of the other embodiments or aspects described herein.

BRIEF DESCRIPTION OF THE DRAWINGS

Various aspects of the present disclosure are described hereinbelow with reference to the drawings, which are not necessarily drawn to scale, which are incorporated in and constitute a part of this specification, wherein.

DETAILED DESCRIPTION

Figure 1:
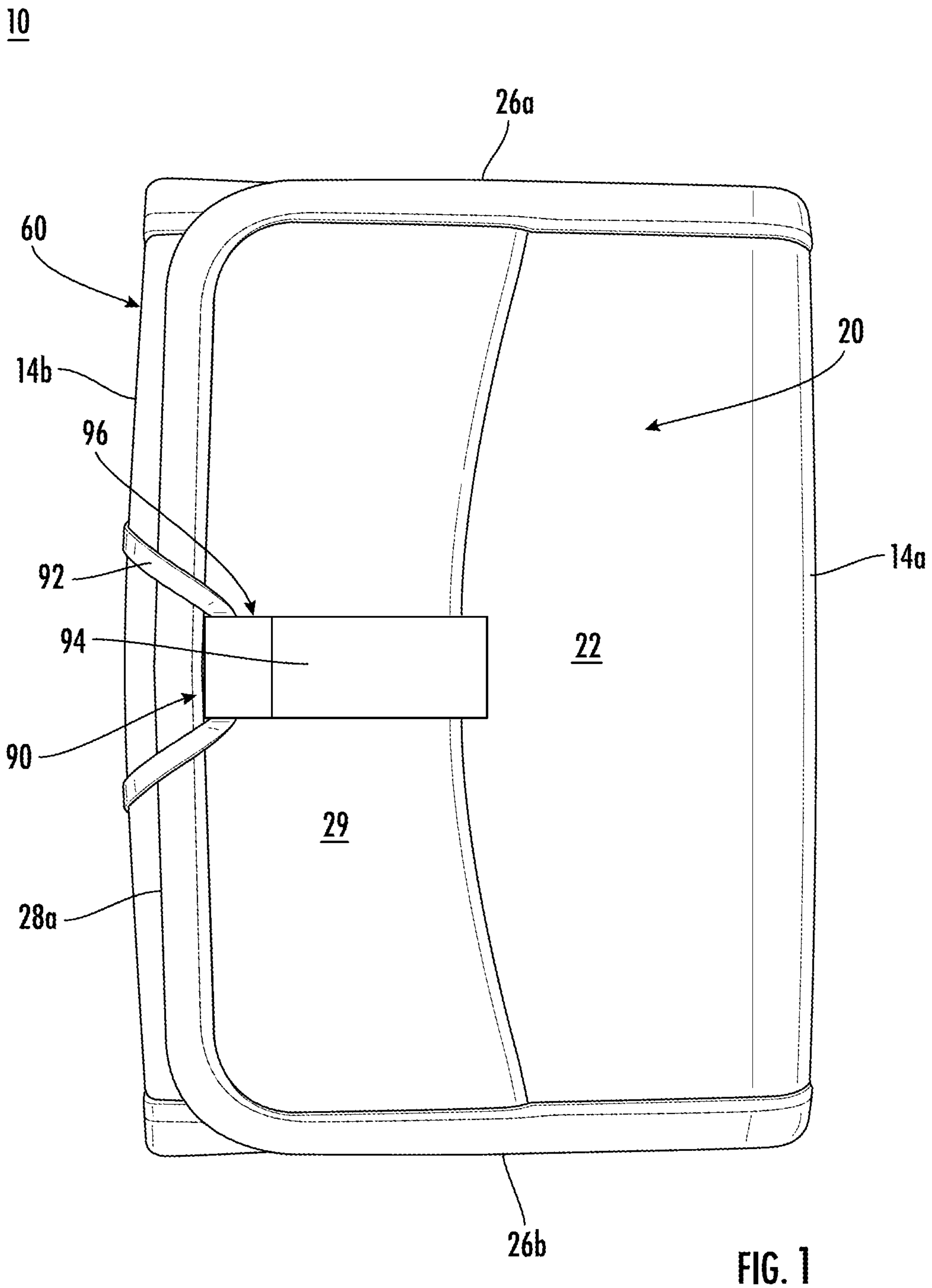
FIG. 1 is a front view of a foldable holder according to an embodiment of the present disclosure in a closed configuration thereof.

The present disclosure will now be described more fully hereinafter with reference to example embodiments thereof with reference to the drawings in which like reference numerals designate identical or corresponding elements in each of the several views. These example embodiments are described so that this disclosure will be thorough and complete, and will fully convey the scope of the disclosure to those skilled in the art. Features from one embodiment or aspect can be combined with features from any other embodiment or aspect in any appropriate combination. For example, any individual or collective features of method aspects or embodiments can be applied to apparatus, product, or component aspects or embodiments and vice versa. The disclosure may be embodied in many different forms and should not be construed as limited to the embodiments set forth herein; rather, these embodiments are provided so that this disclosure will satisfy applicable legal requirements. As used in the specification and the appended claims, the singular forms "a," "an," "the," and the like include plural referents unless the context clearly dictates otherwise. In addition, while reference may be made herein to quantitative measures, values, geometric relationships or the like, unless otherwise stated, any one or more if not all of these may be absolute or approximate to account for acceptable variations that may occur, such as those due to manufacturing or engineering tolerances or the like.

Figure 2:
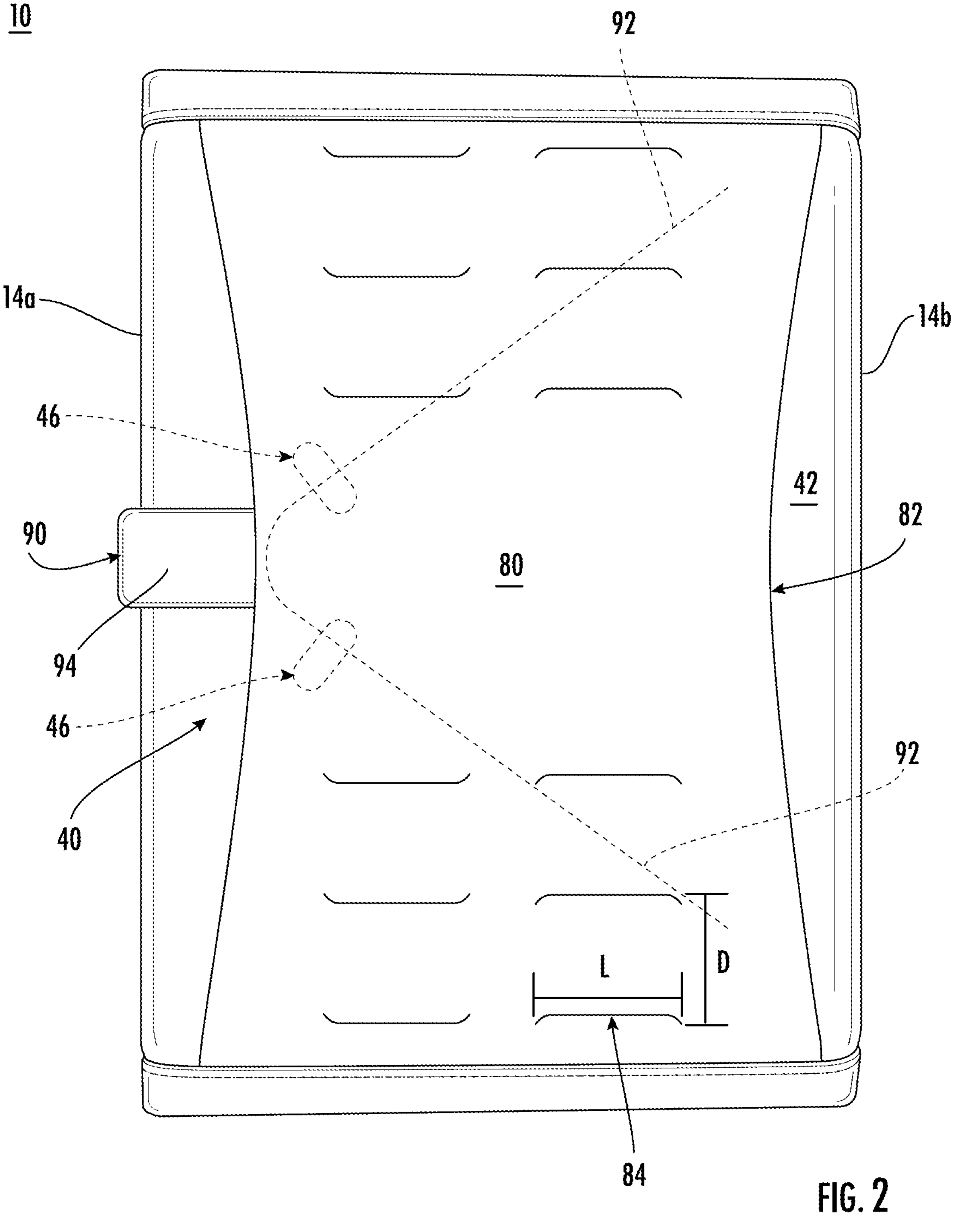
FIG. 2 is a rear view of the foldable holder of FIG. 1.
Figure 3:
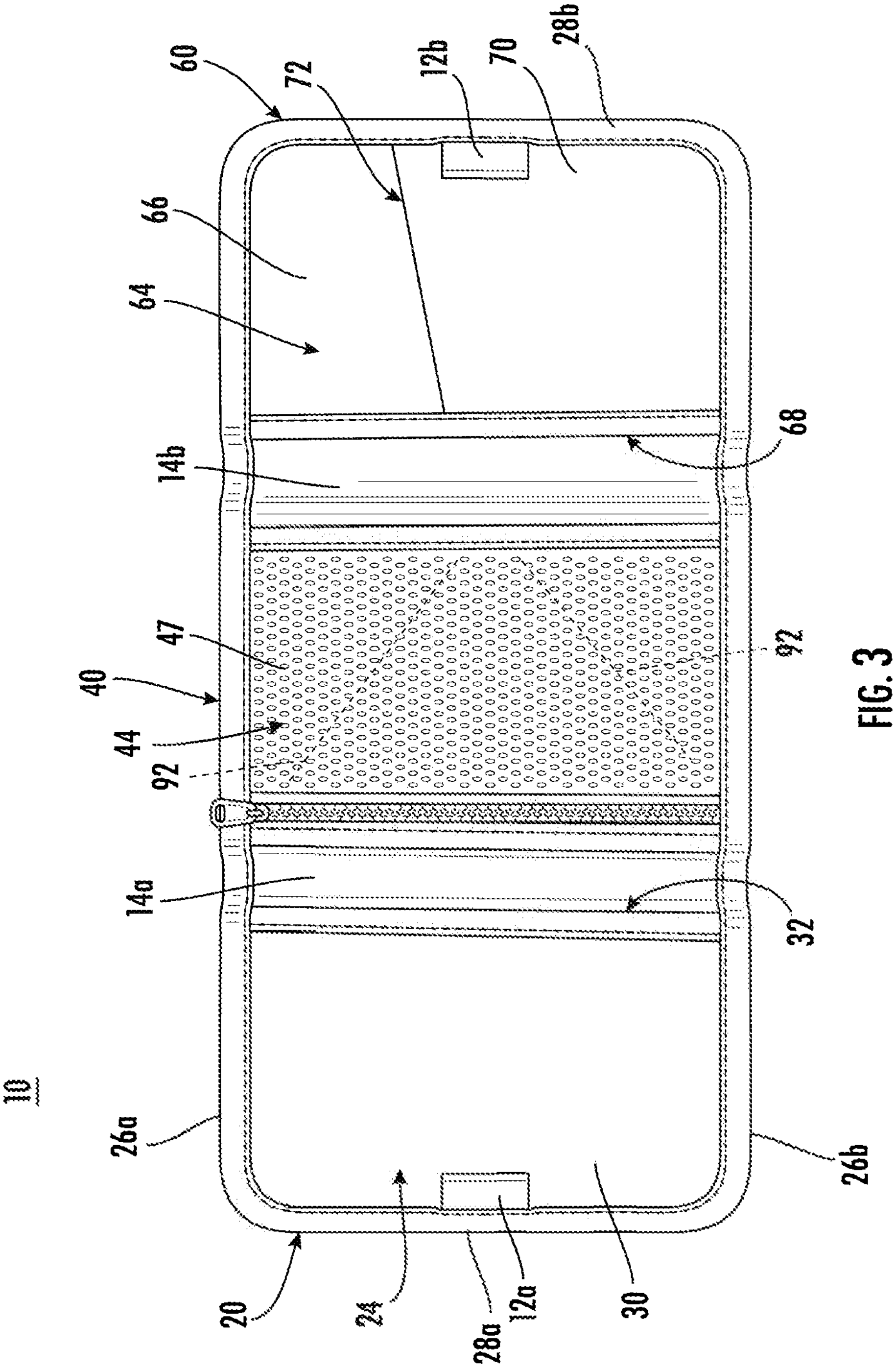
FIG. 3 is a front view of the foldable holder of FIG. 1 in an open configuration thereof.
Figure 4:
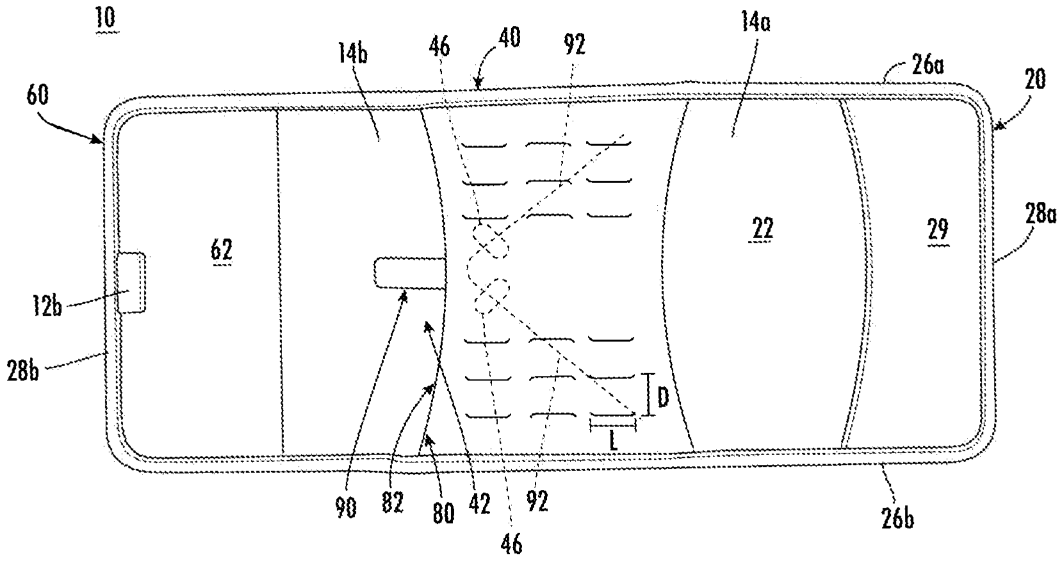
FIG. 4 is rear view of the foldable holder of FIG. 3.

Referring now to FIGS. 1-4, a foldable holder 10 includes a first panel 20, a second panel 40, a third panel 60, a shroud 80, and a retractable closure 90. The foldable holder 10 may fold between a closed configuration (FIG. 1) and an open configuration (FIG. 3). In each of the open and closed configurations the foldable holder encloses and retains media or digital devices such as looseleaf paper, notebooks, maps, printed media, cell phones, tablets, and laptop computers. In the closed configuration, the first panel 20, the second panel 40, and the third panel 60, collectively "the panels," are stacked relative to one another with the third panel 60 disposed between the first panel 20 and the second panel 40 (FIG. 1). In the closed configuration, the first panel 20 may define the front of the foldable holder 10 and the second panel 40 may define the back of the foldable holder 10. When on a flat surface, in the open configuration the panels 20, 40, 60 are substantially coplanar with one another as shown in FIG. 3. In the open configuration the second panel 40 is disposed between the first panel 20 and the third panel 60. The panels 20, 40, 60 articulate about two folds **14*a*, 14*b*. The folds 14*a*, 14*b* may define a boundary between the panels 20, 40, 60. For example, the fold 14*a* may define the boundary between the first panel 20 and the second panel 40, and the fold 14*b* may define the boundary between the second panel 40 and the third panel 60. In embodiments, the folds 14*a*, 14*b* may be flexible articulations, e.g., folds in a piece of fabric. For example, the flexible articulations may be folds in a monolithically formed piece of fabric or may be pieces of fabric attached, e.g., sewn, to the panels 20, 40, 60. In certain embodiments, the folds 14*a*, 14*b*** may be fixed articulations, e.g., hinges.

The first panel 20 includes an exterior face 22, an interior face 24, a segment of two side edges **26*a*, 26*b*, an end edge 28*a*, and a closure engagement surface 29**. The side edges

26*a*, 26*b* extend the length of the foldable holder 10 and define a side edge 26*a* and 26*b* for each of the panels 20, 40, 60. The engagement surface 29 may be attached to the exterior face 22 of the first panel 20 such that the engagement surface 29 extends between the side edges 26*a*, 26*b* of the first panel 20 and along the end edge 28*a*. The engagement surface 29 may be half of a two-part fastening system, e.g., a hook and loop fastening system. The engagement surface 29 may be the hook part or the loop part of the two-part fastening system. In some embodiments, the engagement surface 29 may cover the exterior face 22 of the first panel 20. In certain embodiments, the foldable holder 10 may have multiple engagement surfaces 29. For example, an engagement surface 29 may extend along each side edge 26*a*, 26*b* of the first panel 20. The first panel 20 may have a transparent sleeve 30 attached to the interior face 24 to define a pocket 32 between the transparent sleeve 30 and the interior face 24. The transparent sleeve may be configured to allow a user to eraseably write on the transparent sleeve 30 such that writing overlays media, e.g., a map, received within the pocket 32.

Figure 5:
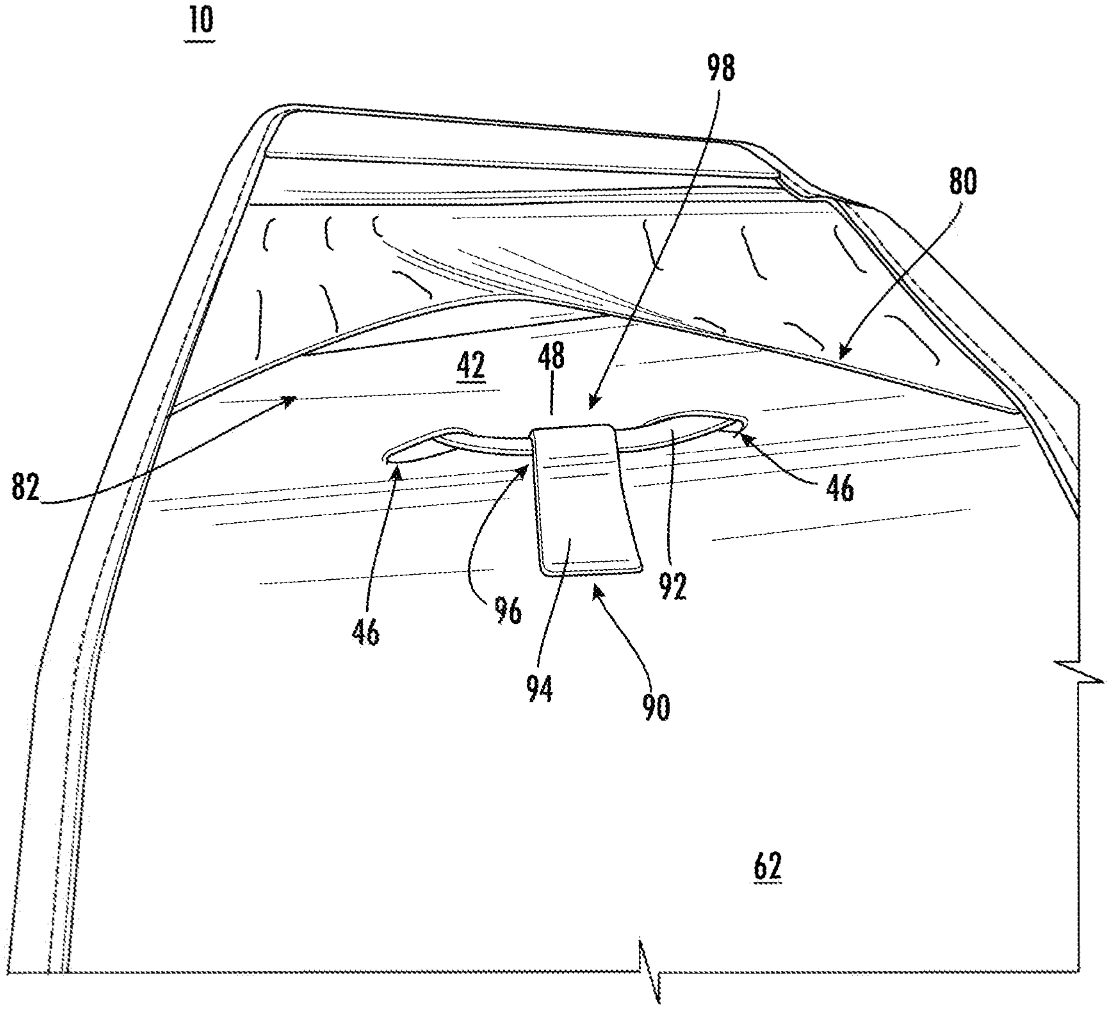
FIG. 5 is an end perspective view of the foldable holder of FIG. 4.
Figure 6:
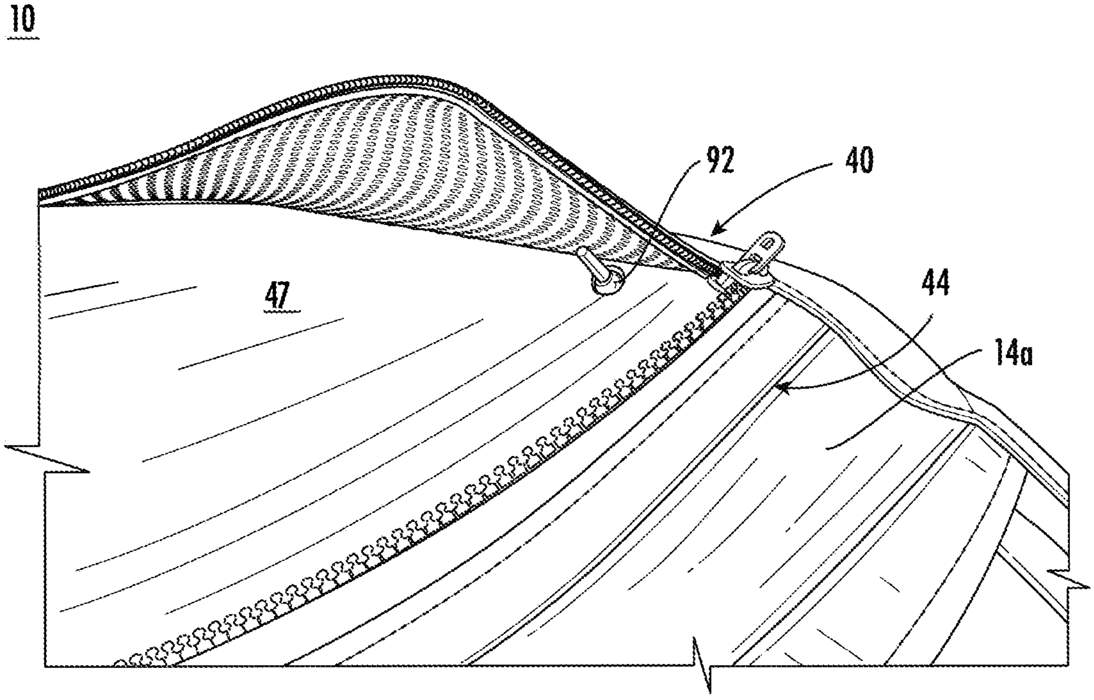
FIG. 6 is an enlarged detail view of a portion of the foldable holder of FIG. 3.

With additional reference to FIGS. 5 and 6, the second panel 40 includes an exterior face 42, an interior face 44, a segment of the two side edges 26*a* and 26*b*, and defines a pair of closure slots 46 therethrough. The closure slots 46 may receive a portion the retractable closure 90 such that a portion of the retractable closure 90 extends along the interior face 44.

The shroud 80 attaches to the exterior face 42 of the second panel 40 and defines a shroud passage 82 between the shroud 80 and the exterior face 42 of the second panel 40. In embodiments, the shroud passage 82 may be open on each end thereof. In certain embodiments, the shroud passage 82 may open on one end thereof such that the shroud passage 82 forms an exterior pocket on the exterior face 42 of the second panel 40. The shroud 80 may conceal the closure slots 46. The shroud 80 may have concave edges formed about a centerline such that the shroud 80 is narrower at its centerline than at its periphery. The shroud 80 may have concave edges formed about the horizontal centerline, the vertical centerline, or both. The shroud 80 may define a plurality of slots 84. The slots 84 may be dimensioned to be compatible with modular lightweight load-carrying equipment, e.g., MOLLE-style pouches. For example, the slots 84 may have a length L in the range of 35 mm to 40 mm, e.g., 38 mm, and be spaced a distance D in the range of 22 mm to 28 mm, e.g., 25 mm. The interior face 44 of the second panel 40 may include a pouch 47 (FIG. 3). The pouch 47 may be formed from a mesh material, as shown, or may be formed from any suitable material for the purpose. For example, the pouch 47 may be formed of a water-resistant material for storage items sensitive to water.

The third panel 60 includes an exterior face 62 and an interior face 64, a segment of the two side edges 26*a* and 26*b*, and an end edge 28*b*. The third panel 60 may include a board 66 attached to the interior face 64 of the third panel. The board 66 defines a pocket 68 between the board 66 and the interior face 64. The pocket 68 may be dimensioned to receive a portion of a notebook to retain the notebook to the third panel 60 such that the notebook may open and close while retained in the foldable holder 10. The board 66 may be made of a rigid material. For example, the board 66 may be made of a plastic (e.g., a thermoplastic or thermoset), a composite (e.g., carbon fiber composite), or a laminated fiberboard. In some embodiments, a slat 70 may be attached to the board 66 to define a slip opening 72 between the slat 70 and the board 66 to receive a portion of a notepad to retain the notepad to the third panel 60.

In some embodiments, the first panel 20, the second panel 40, and the third panel 60 may be formed as a monolithic piece of fabric. In particular embodiments, the exterior faces 22, 42, 62 of the panels 20, 40, 60, may be formed as a single continuous piece of fabric. In certain embodiments, the interior faces 24, 44, 64 of the panels 20, 40, 60 may be formed as a single continuous piece of fabric. In embodiments, the exterior faces 22, 42, 62 and the interior faces 24, 44, 64 may be opposite sides of a single continuous piece of fabric forming the panels 20, 40, 60.

Returning to FIGS. 1 and 2, the retractable closure 90 includes an elastic retraction member 92 and a closure tab 94. The retractable closure 90 is moveable between a secured state (FIG. 1) and a retracted state (FIG. 2). When in the secured state the retractable closure 90 retains the foldable holder 10 in the closed configuration. Specifically, the retractable closure 90 is disposed about the end edge 28*a* of the first panel 20 and the closure tab 94 is engaged with the exterior face 22 of the first panel 20 in the secured state. The closure tab 94 of the retractable closure 90 is at least partially disposed within the shroud passage 82 in the retracted state as shown in FIG. 2. In embodiments, the retraction member 92 is withdrawn into the shroud passage 82 such that the retraction member 92 is concealed by the shroud 80 in the retracted state. In some embodiments, the closure tab 94 is at least partially disposed in the shroud passage 82 in the retracted state. In certain embodiments, a portion of the closure tab 94 is exposed or protruding from the shroud passage 82 in the retracted state.

The elastic retraction member 92 urges the retractable closure 90 toward the reacted state. Retraction of the retractable closure 90 may be resisted by engagement of the closure tab 94 with the engagement surface 29. In the retracted state, the retractable closure 90 may contact the closure stop section 48. The closure stop section 48 may prevent over retraction of the retractable closure 90. In some embodiments, the closure tab 94 protrudes from beneath the shroud 80 in the retracted state. In particular embodiments, the closure tab 94 is retracted within the shroud passage 82 and concealed from view in the retracted state.

Figure 11:
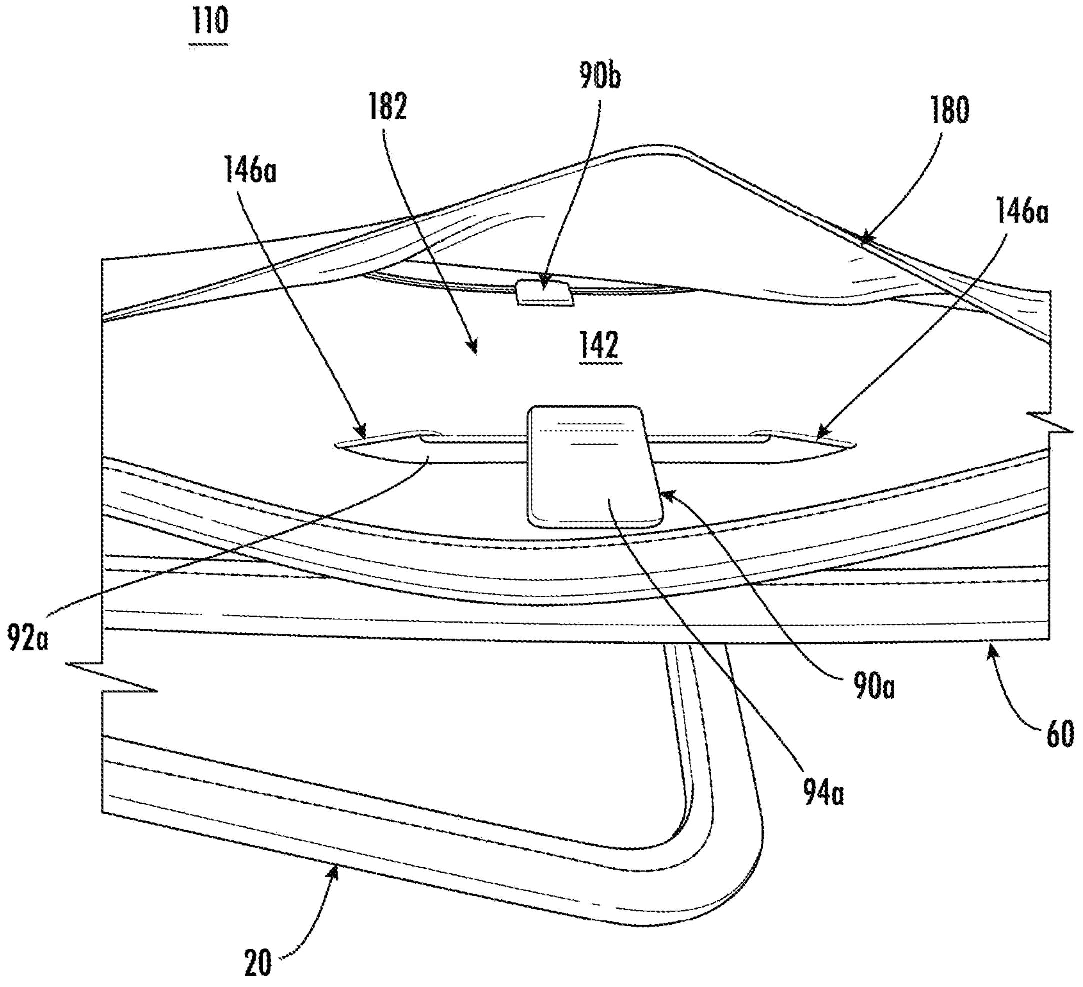
FIG. 11 is a side perspective view of the foldable holder of FIG. 8.

With additional reference to FIGS. 5 and 6, the retraction member 92 is received through the closure slots 46 with a portion of the retraction member 92 disposed along the interior face 44 of the second panel 40. The retraction member 92 forms a bight 98 between the points at which the retraction member 92 is secured to the second panel 40. An exterior segment of the bight 98 extends outwardly from the exterior face 42 and an interior segment of the bight 98 extends along the interior face 44. In some embodiments, the retraction member 92 is tied at its ends such that the ends are secured to the second panel 40 as shown in FIG. 6. The knot tied in end portions of the retraction member 92 may allow for adjustment of the bight 98 of the retraction member 92. For example, an elastic force in the bight 98 may be increased by tying a knot away from an end of the retraction member 92. In some embodiments, the knot may be a sliding knot. In certain embodiments, the end portions of the retraction member 92 may include a cord lock to secure and/or allow for adjustment of the retraction member 92. Adjustment of the retraction member 92 may increase or decrease a length of the bight 98 in a fully extended state thereof. Increasing or decreasing the length of the bight 98 may increase or decrease an elastic force exerted by the retraction member 92 on the closure tab 94 in the secured state. The length of the bight 98 in the fully extended is the length of the bight 98 when under a maximum tensile load such that increasing the length of the bight 98 allows the bight 98 to extend a greater length when under a maximum tensile load. In embodiments, the ends of the retraction member 92 may be fixed to the interior face 44 of the second panel 40. In certain embodiments, the ends of the retraction member 92 may be fixed to a retention platform 150 (FIG. 11). In certain embodiments, the ends of the retraction member 92 may be sewn to the interior face 44 of the second panel 40.

The closure tab 94 is coupled to the retraction member 92. The closure tab 94 may be folded and connected to itself to define a tab loop 96. The connection of the closure tab 94 to itself to form tab loop 96 may be by stitching, ultrasonic welding, or adhesive boding. The closure tab 94 may receive the retraction member 92 through the tab loop 96 to slidably couple the closure tab 94 to the retraction member 92. In embodiments, the closure tab 96 is fixedly coupled to the retraction member 92. The closure tab 94 has half of a two-part fastener system, e.g., a hook and loop fastener system, to engage the cooperating half of the two-part fastener system of the engagement surface 29 when the retractable closure 90 is in the secured state. The closure tab 94 may have the hook part or the loop part of the two-part fastening system. The closure tab 94 may slide along the retraction member 92 to engage the engagement surface 29 along the end edge 28*a* at multiple positions. In some embodiments, the retraction member 92 engages the engagement surface 29 adjacent one of the side edges 26*a*, 26*b* of the first panel 20 or at a middle of the engagement surface 29. The closure tab 94 may be made of an inelastic or rigid material. The closure tab 94 may act as a grab tab to allow for movement of the retractable closure 90 from the retracted state to the secured state. In particular embodiments, the two-part fastening system may be a magnetic fastening system. For example, the closure tab 94 may have a magnet and the engagement surface 29 may have a magnetic material, or vice versa. In certain embodiments, the two-part fastening system may be mechanical snaps, e.g., snap buttons or side release buckles. In embodiments, the retractable closure 90 may include more than one fastening system.

In particular embodiments, the retraction member 92 and a portion of the closure tab 94 are of unitary construction. The retraction member 92 and the portion of the closure tab 94 may be formed of an elastic material. The retractable member 92 and the portion of the closure tab 94 may be laser cut from a single piece of elastic material. The portion of the closure tab 94 may have the part of the two-part fastener system attached thereto.

Figure 7:
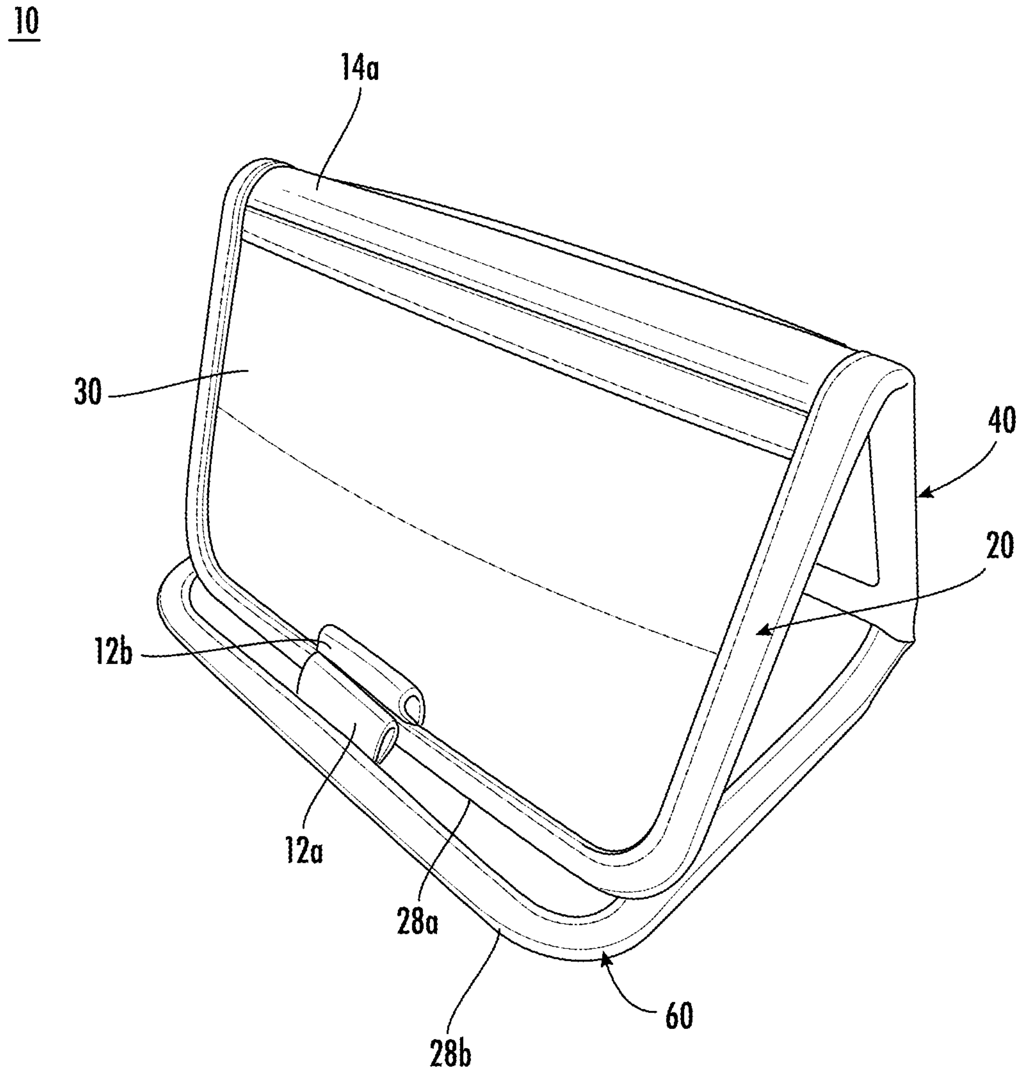
FIG. 7 is a perspective view of the foldable holder of FIG. 1 in an elevated configuration.

Referring to FIG. 7, the foldable holder 10 may have an elevated configuration in which the end edge 28*a* of the first panel 20 contacts the exterior face 62 (FIG. 4) adjacent the end edge 28*b* of the third panel 60 such that the panels 20, 40, 60 form a triangle with one another. The foldable holder 10 may include a plurality of pen loops 12*a*, 12*b* attached to the panels 20, 40, or 60. The pen loops 12*a*, 12*b* may engage end edge 28*a* of the first panel 20 to retain the foldable holder 10 in the elevated configuration. In some embodiments, two pen loops 12*a*, and 12*b* may be aligned to receive the body of a pen in one of the pen loops 12*a* and the clip of the pen cap in the other of the pen loops 12*b* to resist the foldable holder 10 leaving the elevated configuration. In particular embodiments, a pen cap itself may be received in pen loop 12*a* and the clip of the pen cap may be received in pen loop 12*b*, leaving the pen free for use and the foldable holder 10 retained in the elevated configuration by the pen cap. In certain embodiments, the pen loops 12*a* and 12*b* may be aligned to receive the body of a single pen through both pen loops 12*a* and 12*b*.

Figure 8:
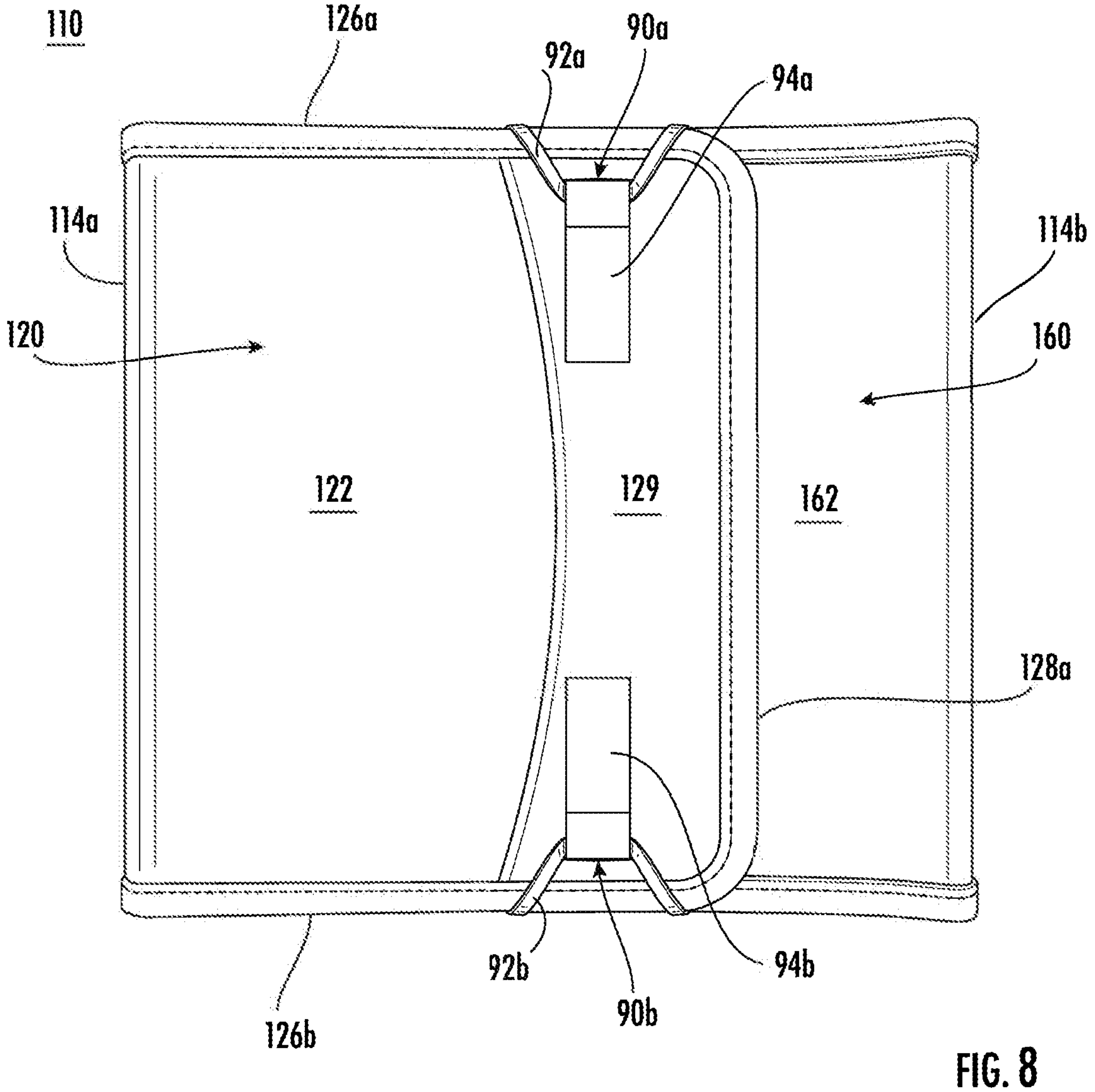
FIG. 8 is a front view of another foldable holder according to embodiments of the present disclosure in a closed configuration thereof.
Figure 9:
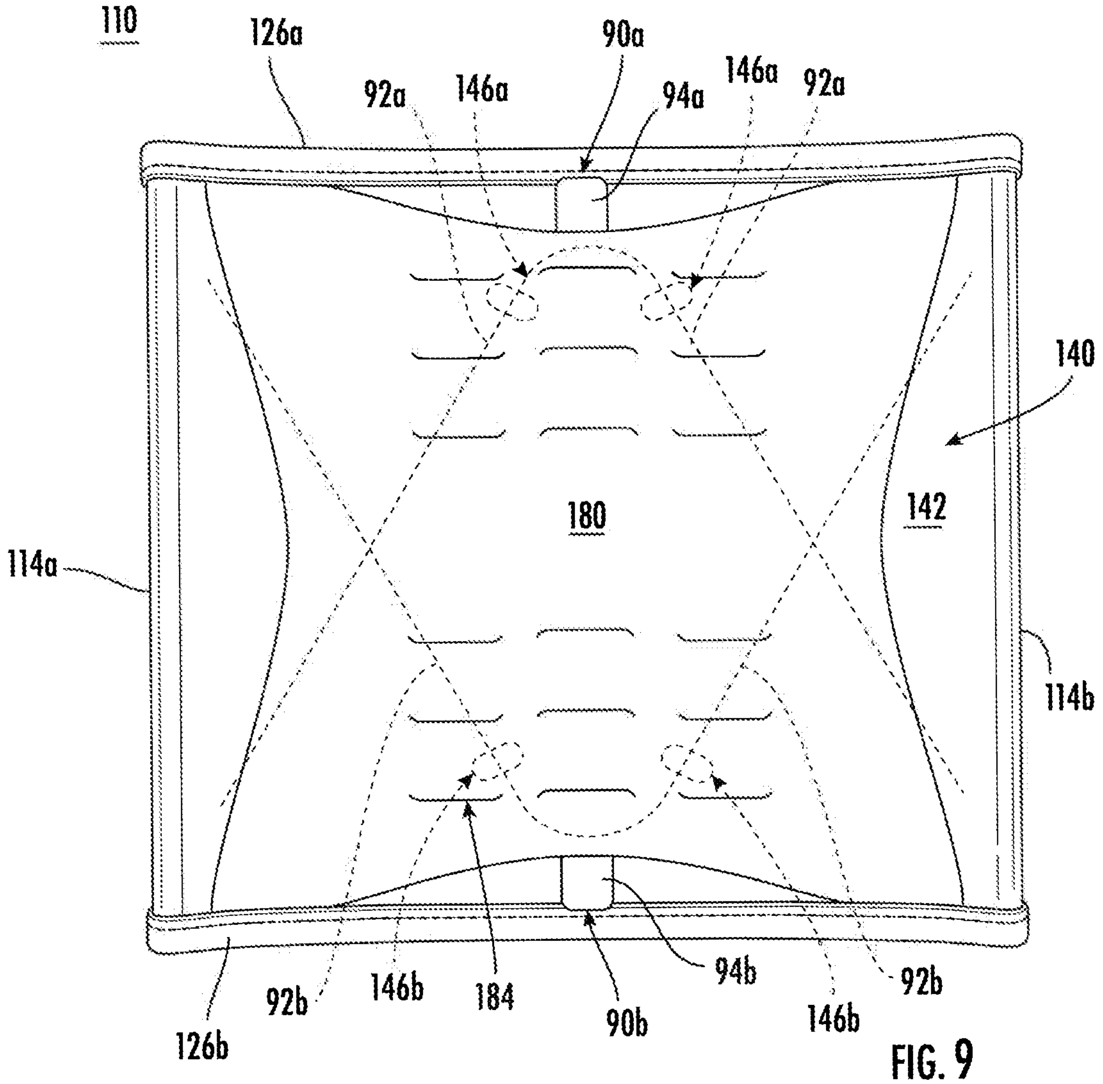
FIG. 9 is a rear view of the foldable holder of FIG. 8.

Referring now to FIGS. 8 and 9, another foldable holder 110 provided in accordance with the present disclosure. Some elements of the foldable holder 110 are similar to elements of the foldable holder 10 and are labeled with a similar label including a preceding "1" to the label of the similar element of the foldable holder 10 and will not be detailed herein for reasons of brevity except for the differences with the foldable holder 10.

The foldable holder 110 includes two retractable closures 90*a* and 90*b*. The two retractable closures 90*a* and 90*b* may be disposed about opposite side edges 126*a* and 126*b* of the first panel 120 and engaged with the engagement surface 129. Including two retractable closures 90*a* and 90*b* may increase the closure strength retaining the foldable holder 110 in the closed configuration. Including two retractable closures 90*a*, 90*b* may securely store a digital device or a substantial mass of documents within the foldable holder 110. In some embodiments, multiple digital devices and/or external auxiliary batteries to serve as power banks may be retained in the foldable holder 110. Disposing the two retractable closures 90*a* and 90*b* about the side edges 126*a* and 126*b* of the panels 120, 140, 160 may prevent loss of loose papers or items stored within the foldable holder 110.

Figure 10:
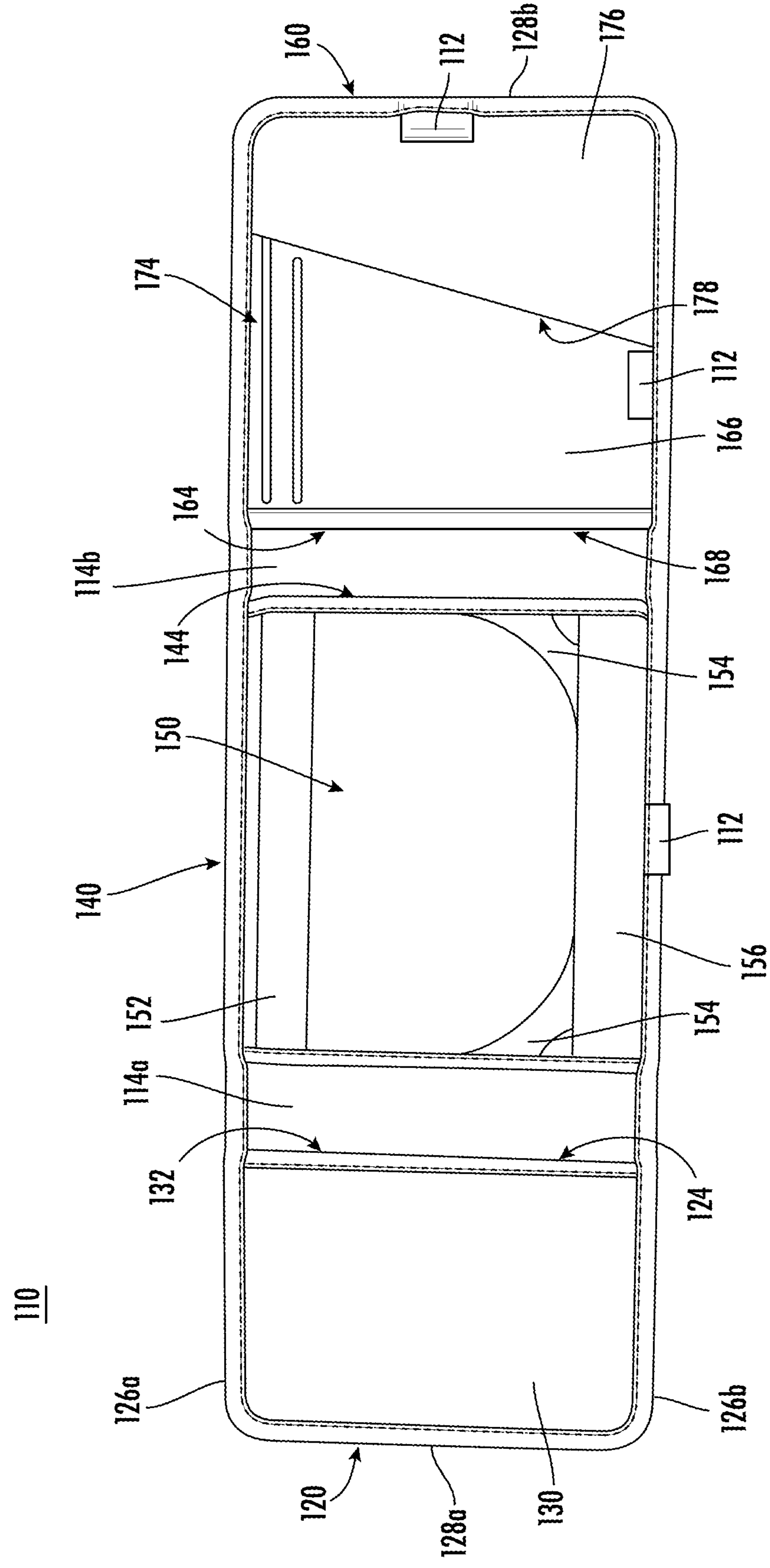
FIG. 10 is a front view of the foldable holder of FIG. 8 in an open configuration thereof.
Figure 12:
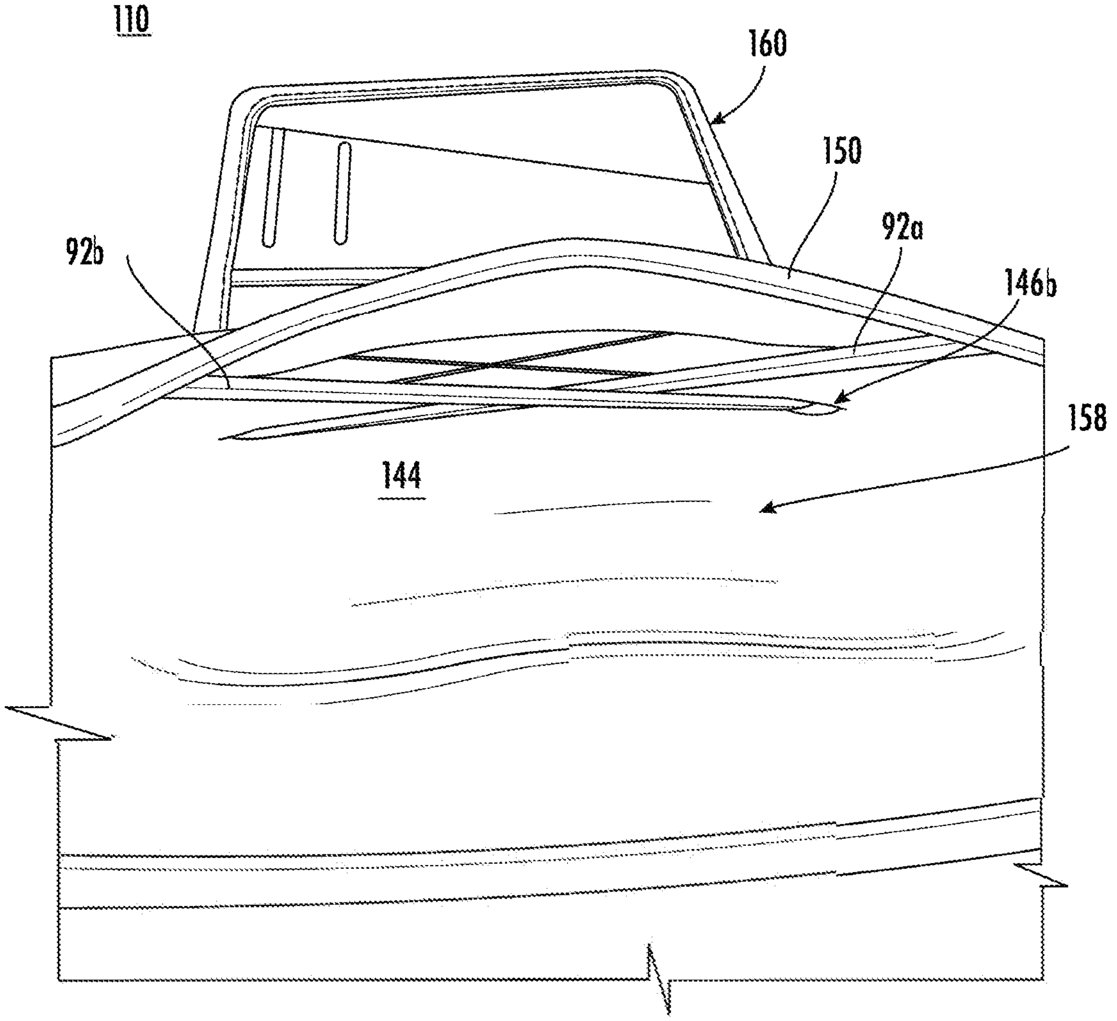
FIG. 12 is an enlarged detail view of a portion of the foldable holder of FIG. 10.

With additional reference to FIGS. 10-12, the second panel 140 of the foldable holder 110 may be configured to retain a digital device. The second panel 140 includes an exterior face 142, an interior face 144, and defines a pair of closure slots 146*a*, 146*b* for each retractable closure 90*a*, 90*b*. The closure slots 146*a*, 146*b* receive the retraction member 92*a*, 92*b* such that the retractable closure may attach to the interior face 144 of the second panel 140. The retraction members 92*a*, 92*b* may be stitched to the second panel 140. Stitching the retraction members 92*a*, 92*b* may provide flat connection to the foldable holder 110 such that the interior face 144 remains smooth.

With particular reference to FIG. 10, the second panel 140 has a retention platform 150 attached to the interior face 144. The retention platform 150 may be rigid to support a digital device retained on the retention platform 150. The retention platform 150 may define a space 158 (FIG. 12) between the retention platform 150 and the interior face 144. The retraction members 92*a*, 92*b* may be stitched to the retention platform 150 as shown in FIG. 11. The retention platform 150 may include a transverse strap 152 and corner straps 154. The retention platform 150 may receive a digital device such as a laptop computer or a tablet, e.g., an iPad®, iPad Mini®, Microsoft Surface®. In some embodiments, the digital device may include a case and/or a keyboard with the case and/or the keyboard received on the retention platform 150. In particular embodiments, multiple digital devices and/or external auxiliary batteries to serve as power banks may be retained in the foldable holder 110. A digital device may be retained to the foldable holder 110 with the transverse strap 152 extended across a portion of the digital device with the corners of the digital device disposed within the corner straps 154. The retention platform 150 may be made of a rigid, an elastic, or a semi-elastic material. The foldable holder 110 may include a wrist-rest 156 attached to the interior face 144 of the second panel 140. The wrist-rest is positioned adjacent the corner straps 154 such that when a digital device is received by the retention platform 150 the wrist-rest is positioned under wrists of a user when using the digital device.

The third panel 160 includes an exterior face 162 and an interior face 164. The third panel 160 has a board 166 attached to the interior face 164 of the third panel. The board 166 defines a pocket 168 between the board 166 and the interior face 164. The pocket 168 may receive a portion of a notebook to retain the notebook to the third panel 160 such that the notebook may open and close while retained to the foldable holder 110. The board 166 may be made of any suitably rigid material. For example, the board 166 may be made of a plastic (e.g., a thermoplastic or thermoset), a composite (e.g., carbon fiber composite), or a laminated fiberboard. The board 166 may define an elongate slit 174 to receive a portion of a notepad to retain the notepad to the third panel 160. A flap 176 may be attached to the third panel 160 to define a flap pocket 178 between the board 166.

While several embodiments of the disclosure have been shown in the drawings, it is not intended that the disclosure be limited thereto, as it is intended that the disclosure be as broad in scope as the art will allow and that the specification be read likewise. Any combination of the above embodiments is also envisioned and is within the scope of the appended claims. Therefore, the above description should not be construed as limiting, but merely as exemplifications of particular embodiments. Those skilled in the art will envision other modifications within the scope of the claims appended hereto.

What is claimed:

1. A foldable holder comprising:

a first panel including an engagement surface extending along an end edge of the first panel;

a second panel;

a shroud attached to the second panel to define a shroud passage between the shroud and the second panel;

a third panel, the foldable holder having a closed configuration in which the first panel, the second panel, and the third panel are stacked with one another and an open configuration in which the first panel, the second panel, and the third panel are substantially coplanar with one another; and a retractable closure moveable between a secured state and a retracted state, in the secured state the retractable closure is engaged with the first panel to retain the foldable holder in the closed configuration, the retractable closure comprising:

an elastic retraction member configured to urge the retractable closure towards the retracted state, and a closure tab engaged with the engagement surface in the secured state, the closure tab at least partially disposed within the shroud passage in the retracted state.

2. The foldable holder according to claim 1, wherein the closure tab defines a tab loop that receives the retraction member therethrough such that the closure tab is slidably coupled to the retraction member.

3. The foldable holder according to claim 2, wherein the closure tab is engageable with the engagement surface at multiple positions.

4. The foldable holder according to claim 1, wherein in the retracted state, the closure tab at least partially protrudes from the shroud passage and the retraction member is concealed within the shroud passage.

5. The foldable holder according to claim 1, wherein in the secured state, the retractable closure extends about the end edge of the first panel.

6. The foldable holder according to claim 1, wherein the retraction member is secured to the second panel to form a bight, the bight having an elastic force therein to urge the retractable closure toward the retracted state, the elastic force of the bight in the retracted state being adjustable.

7. The foldable holder according to claim 1, wherein the retractable closure is disposed about a first side edge of the first panel in the secured state.

8. The foldable holder according to claim 7, further comprising a second retractable closure disposed about a second side edge of the first panel opposite the first side edge of the first panel in the secured state.

9. A foldable holder comprising:

a first panel having an exterior face, an interior face, and an end edge, the exterior face of the first panel including an engagement surface disposed along the end edge;

a second panel extending from the first panel in a direction away from the end edge of the first panel, the second panel having an exterior face and an interior face, the second panel including a shroud attached to the exterior face of the second panel, the second panel including a shroud passage defined between the shroud and the exterior face of the second panel;

a third panel extending from the second panel in the direction away from the end edge of the first panel, the third panel having an exterior face and an interior face, the foldable holder having a closed configuration in which the first panel, the second panel, and the third panel are stacked with one another and an open configuration in which the first panel, the second panel, and the third panel are substantially coplanar with one another; and a retractable closure attached to the second panel and moveable between a secured state and a retracted state, in the secured state the retractable closure is engaged with the first panel to retain the foldable holder in the closed configuration, the retractable closure comprising:

an elastic retraction member urging the retractable closure towards the retracted state, the retraction member concealed in the shroud passage in the retracted state; and a closure tab slidably coupled to the retraction member, the closure tab at least partially disposed in the shroud passage in the retracted state.

10. The foldable holder according to claim 9, wherein the closure tab is engageable with the engagement surface at multiple positions.

11. The foldable holder according to claim 9, wherein the second panel defines two closure slots separated by a closure stop section, the retraction member passes through each of the closure slots such that a bight of the retraction member has an interior segment that extends along the interior face of the second panel and an exterior segment disposed between the exterior face of the second panel and the shroud.

12. The foldable holder according to claim 11, wherein the closure stop section contacts the retractable closure in the retracted state such that the closure tab extends from the shroud passage.

13. The foldable holder according to claim 9, wherein the closure tab is made of an inelastic material and defines a tab loop that receives the retraction member therethrough to slidably couple the closure tab to the retraction member.

14. The foldable holder according to claim 13, wherein the closure tab includes a first part of a two-part fastener system and the engagement surface includes a second part of the two-part fastener system.

15. The foldable holder according to claim 14, wherein the two-part fastener system is a hook and loop fastener system with one of the first part or the second part being a hook part and the other of the first part and the second part being a loop part.

16. The foldable holder according to claim 9, wherein the first panel, the second panel, and the third panel are monolithically formed with one another.

17. The foldable holder according to claim 9, wherein the second panel further comprises a retention platform having a plurality of straps attached to the interior face of the second panel, the plurality of straps configured to retain a digital device to the foldable holder.

18. The foldable holder according to claim 17, wherein the plurality of straps includes a transverse strap that is configured to extend across the digital device and two corner straps that are configured to receive corners of the digital device.

19. The foldable holder according to claim 17, wherein the retention member secures to the retention platform.

20. A foldable holder comprising:

a piece of fabric of monolithic construction having an exterior face, an interior face opposite the exterior face, a first side edge, a second side edge opposite the first side edge, a first end edge, and a second end edge opposite the first end edge, the piece of fabric configured to fold relative to itself such that a first fold and a second fold define a first panel, a second panel, and a third panel, the first panel defined by the first side edge, the first end edge, the second side edge and the first fold, the second panel defined by the first side edge, the first fold, the second side edge and the second fold, the third panel defined by the first side edge, the second fold, the second side edge, and the second end edge, the foldable holder configured to fold between a closed configuration in which the piece of fabric is folded such that the first panel, the second panel, and the third panel are stacked with one another and an open configuration in which the piece of fabric is unfolded;

an engagement surface attached to the exterior face of the first panel and extending along the first end edge;

a shroud attached to the exterior face of the second panel to define a shroud passage between the exterior face of the second panel and the shroud; and a retractable closure attached to the second panel and moveable between a secured state and a retracted state, in the secured state the retractable closure is engaged with the engagement surface to retain the foldable holder in the closed configuration, the retractable closure comprising:

an elastic retraction member urging the retractable closure towards the retracted state, the retraction member concealed in the shroud passage in the retracted state; and a closure tab slidably coupled to the retraction member, the closure tab at least partially disposed in the shroud passage in the retracted state.

* * * * *